(12) United States Patent
Barijough et al.

(10) Patent No.: US 11,042,552 B2
(45) Date of Patent: Jun. 22, 2021

(54) CROWDSOURCED SEARCH RESULT GENERATION

(71) Applicant: FUJITSU LIMITED, Kawasaki (JP)

(72) Inventors: Sanam Mirzazad Barijough, Morgan Hill, CA (US); Jorjeta G. Jetcheva, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 568 days.

(21) Appl. No.: 15/681,246

(22) Filed: Aug. 18, 2017

(65) Prior Publication Data

US 2019/0057094 A1    Feb. 21, 2019

(51) Int. Cl.
| | |
|---|---|
| *G06F 16/2457* | (2019.01) |
| *G06F 16/248* | (2019.01) |
| *G06F 16/242* | (2019.01) |
| *G06F 16/9536* | (2019.01) |

(52) U.S. Cl.
CPC ...... *G06F 16/24578* (2019.01); *G06F 16/248* (2019.01); *G06F 16/2425* (2019.01); *G06F 16/9536* (2019.01)

(58) Field of Classification Search
CPC ........... G06F 16/24578; G06F 16/2425; G06F 16/9536; G06F 16/248
See application file for complete search history.

(56) References Cited

U.S. PATENT DOCUMENTS

| | | |
|---|---|---|
| 8,086,605 B2 | 12/2011 | Xu et al. |
| 9,135,294 B2 | 9/2015 | Ghosh et al. |
| 2004/0205079 A1* | 10/2004 | Azzam ................. G06F 16/3344 |
| 2012/0124040 A1* | 5/2012 | Mungikar ............. G06F 16/248 |
| | | 707/728 |
| 2015/0066968 A1* | 3/2015 | Bastide ................. G06F 3/0482 |
| | | 707/758 |
| 2015/0317320 A1* | 11/2015 | Miller ............... G06F 16/90324 |
| | | 707/728 |
| 2017/0060873 A1* | 3/2017 | Rathod .................. G06Q 10/06 |
| 2017/0364802 A1* | 12/2017 | Gordon ..................... G06N 5/02 |

(Continued)

OTHER PUBLICATIONS

Google. (2017). Google Scholar. https://scholar.google.com/.

(Continued)

*Primary Examiner* — Ashish Thomas
*Assistant Examiner* — Abdullah A Daud
(74) *Attorney, Agent, or Firm* — Maschoff Brennan

(57) ABSTRACT

A method may include obtaining multiple search paths, each search path including a previous search query and multiple search materials. The method may include generating multiple relevancy scores corresponding to the search paths. The method may include obtaining a current search query of a new search. The method may include identifying one or more previous search queries that match the current search query. The method may include identifying a first search path and a second search path based on the first search path and the second search path corresponding to the matching previous search queries. The method may include comparing a first relevancy score of the first search path with a second relevancy score of the second search path. The method may include presenting the search materials of the first search path in response to the first relevancy score being greater than the second relevancy score.

20 Claims, 6 Drawing Sheets

(56) References Cited

U.S. PATENT DOCUMENTS

2018/0047071 A1* 2/2018 Hsu .................... G06Q 30/0282
2018/0300393 A1* 10/2018 Brandstetter ...... G06Q 30/0277

OTHER PUBLICATIONS

StackOverflow. (2017). "Jacascript Detect Browser Close Tab/Close Browser". https://stackoverflow.com/questions/3888902/javascript-detect-browser-close-tab-close-browser. Retrieved Aug. 17, 2017.
StackOverflow. (2017). "Jacascript to Detect If User Changes Tab". https://stackoverflow.com/questions/10338704/javascript-to-detect-if-user-changes-tab. Retrieved Aug. 17, 2017.
Beel, J., & Gipp, B. (Apr. 2009). Google Scholar's ranking algorithm: the impact of citation counts (an empirical study). In Research Challenges in Information Science, 2009. RCIS 2009. Third International Conference on (pp. 439-446). IEEE.

* cited by examiner

CROWDSOURCED SEARCH RESULT GENERATION

FIELD

The embodiments discussed herein are related to crowdsourced search result generation.

BACKGROUND

With the growth of electronically available material, an individual performing an electronic or online search for a particular topic may be inundated with material that may not be relevant or reliable. For example, some searches may generate hundreds of results, which may not be ordered in a way that is useful to a user. It can be difficult for an individual to sift through all of the search results to identify relevant materials.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include obtaining multiple search paths followed by multiple users. Each search path may include a previous search query and multiple search materials returned as results to the corresponding previous search query and examined by the corresponding user. The method may also include obtaining multiple first relevancy scores. Each relevancy score of the multiple first relevancy scores may correspond to a search material of the multiple search materials. Each relevancy score of the multiple first relevancy scores may indicate a relevancy of the corresponding search material to its corresponding previous search query. The method may further include generating multiple second relevancy scores. Each relevancy score of the multiple second relevancy scores may correspond to a search path of the multiple search paths. Each relevancy score of the multiple second relevancy scores may indicate a relevancy of the corresponding search path to its corresponding previous search query. Each relevancy score of the multiple second relevancy scores may be generated from relevancy scores of the multiple first relevancy scores corresponding to search materials in the corresponding search path. The method may further include obtaining a current search query of a new search. The method may also include identifying one or more previous search queries that match the current search query. The method may further include identifying a first search path and a second search path of the multiple search paths based on the first search path and the second search path corresponding to the one or more matching previous search queries. The first search path may have a first relevancy score of the multiple second relevancy scores and the second search path may have a second relevancy score of the multiple second relevancy scores. The method may further include comparing the first relevancy score with the second relevancy score. The method may also include presenting the search materials of the first search path in response to the first relevancy score being greater than the second relevancy score.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
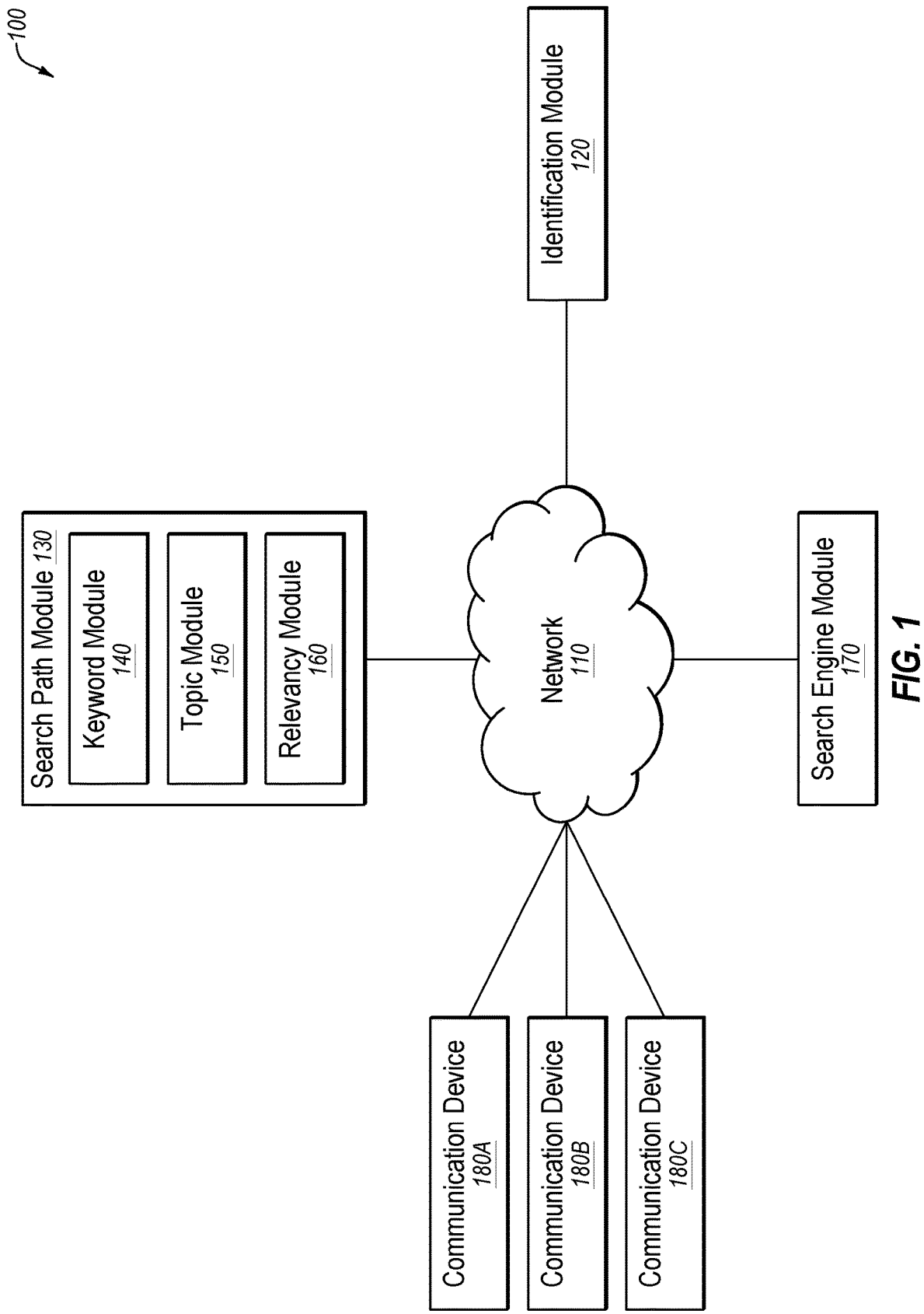
FIG. 1 is a diagram representing an example environment related to crowdsourced search result generation.

Some embodiments described herein relate to methods and systems of the generation of search results using crowdsourcing. Currently, many search materials may be returned as results that are generated in response to electronic searches. The search materials may be arranged based on a variety of criteria. Some search materials may be arranged based on the number of times the search materials are cited in other publications. For example, in some embodiments, a search material that is cited many times may be placed higher in the search results than other search materials. However, the number of times a search material is cited may not be helpful to an individual performing a search for materials related to different topics.

Crowdsourced searching of the present disclosure may allow for materials related to searches to be presented to users according to a determined relevancy of the search materials that may be based on feedback from subject matter experts who perform similar searches. In some embodiments, this may facilitate more efficient finding of search materials, such as finding papers, conferences, research groups, and sites, about different topics, from different disciplines, for potential collaboration, etc. Both the selection of the search materials and the order that the search materials are presented may be based on previous searches and the subsequent search paths performed by subject matter experts that may improve the ability of non-experts to identify and find useful materials for research.

According to one or more embodiments described in the present disclosure, multiple subject matter experts may be identified. Subject matter experts may include individuals who are authors of multiple publications, who are frequently referenced by others, and/or who are renowned in particular fields. Multiple previous search paths followed by the subject matter experts may be obtained. The previous search paths may each include a previous search query and multiple search materials. The previous search query may include text of one or more terms that may be entered by the subject matter expert into a search engine. The search materials may include different articles, websites, links, papers, and conference reports that may be returned in response to the previous search query and that the subject matter expert examined during the search. Relevancy scores indicating a relevancy with respect to the previous search query may be obtained for the various search materials and the various search paths. In some embodiments, the relevancy scores may be obtained based on interactions of the subject matter experts with respect to the search materials (e.g., ratings given, how many different subject matter experts examined the search materials, whether the search materials include any keywords from the previous search query, etc.). When a new search query is obtained from a user (referred to as a "current search query") search paths and search materials associated with one or more previous search queries of the subject matter experts may be selected and presented to the user in response to the current search query. In some embodiments, the search paths and search materials may be selected based on the previous search queries of the subject matter experts matching the current search query and based on the relevancy scores of the search paths and search materials. For example, the search paths or search materials of the matching previous search queries of the subject matter experts with the highest relevancy scores may be presented to the user as results of the current search query.

In the present disclosure, reference to search queries matching may indicate that the search queries are directed toward a same topic and does not require that the search queries be identical. Additionally, in the present disclosure, reference to presentation of a search path may include the presentation of one or more search materials of the search path. In these or other embodiments, the presentation of the search path may include the presentation of two or more of the search materials according to the relevancy scores of the search materials. In some embodiments, the search materials may be presented in descending order from highest relevancy score to lowest relevancy score.

Embodiments of the present disclosure are explained with reference to the accompanying drawings.

FIG. 1 is a diagram representing an example environment 100 related to crowdsourced search result generation. The environment 100 may include a network 110, an identification module 120, a search path module 130, a keyword module 140, a topic module 150, a relevancy module 160, a search engine module 170, a communication device 180A, a communication device 180B, and a communication device 180C.

The network 110 may be configured to communicatively couple the identification module 120, search path module 130, the search engine module 170, the communication device 180A, the communication device 180B, and the communication device 180C. In some embodiments, the network 110 may include any network or configuration of networks configured to send and receive communications between systems and devices. In some embodiments, the network 110 may include a conventional type network, a wired or wireless network, and may have numerous different configurations. In some embodiments, the network 110 may also be coupled to or may include portions of a telecommunications network, including telephone lines such as a public switch telephone network (PSTN) line, for sending data in a variety of different communication protocols, such as a protocol used by a plain old telephone system (POTS).

The communication device 180A, the communication device 180B, and the communication device 180C may include any electronic or digital computing device. For example, the communication device 180A, the communication device 180B, and the communication device 180C may include a desktop computer, a laptop computer, a smartphone, a mobile phone, a tablet computer, a telephone, a phone console, or any other computing device. In some embodiments, the communication device 180A, the communication device 180B, and the communication device 180C may include a computing system configured to perform operations described in this disclosure, among other operations. The computing systems may be similar to the computing system 400 described below with respect to FIG. 4.

In some embodiments, the identification module 120, the search path module 130, and the search engine module 170 may be configured as software, hardware, or a combination of software and hardware to perform operations described below. Additionally, in the present disclosure, the identification module 120, the search path module 130, and the search engine module 170 and their corresponding operations are described and delineated to help facilitate the understanding of different operations that may be performed with respect to the present disclosure. However, depending on certain implementations, such elements may be considered as being part of one or multiple different software or hardware elements that may be organized differently than as specifically described in the present disclosure. In these or other embodiments, the identification module 120, the search path module 130, and the search engine module 170 may be included with or executed by a computing system such as the computing system 400 described with respect to FIG. 4.

In some embodiments, each of the communication device 180A, the communication device 180B, and the communication device 180C may be associated with different users. For example, in some embodiments, the communication device 180A may be associated with a first individual. In these and other embodiments, the communication device 180B may be associated with a second individual. In these and other embodiments, the communication device 180C may be associated with a third individual. In these and other embodiments, the first individual, the second individual, and the third individual may each perform searches of different search materials via the network 110. For example, the three individuals may each perform searches using search queries. The search queries may include text of one or more terms. One or more of the three individuals may be subject matter experts or may be non-subject matter experts. For example, in some embodiments, the three individuals may be subject matter experts in different fields or in the same field. Although depicted with three communication devices 180, the environment 100 may include any number of communication devices 180. For example, in some embodiments, the environment 100 may include ten communication devices 180, one hundred communication devices 180, one thousand communication devices 180, or any other number of communication devices 180. Two or more of the communication devices 180 may be associated with a different user and may be employed by the respective users to perform electronic searches.

The search path module 130 and the communication devices 180 may be communicatively coupled to each other via the network 110. The search path module 130 and the communication devices 180 may also be communicatively coupled with other devices, such as devices associated with other companies, other users, other organizations, or other entities. In the present disclosure, reference to a "module" being communicatively coupled to a device may include instances in which a device that includes or is executing the module is communicatively coupled to the other device in such a manner that the "module" is able to acquire information from, direct the operations of, etc., the other device.

In some embodiments, the search path module 130 may include a keyword module 140, a topic module 150, and a relevancy module 160. In these and other embodiments, the identification module 120, the search path module 130, the keyword module 140, the topic module 150, the relevancy module 160, and the search engine module 170 may be configured as software, hardware, or a combination of software and hardware to perform operations described below. Additionally, in the present disclosure, the identification module 120, the search path module 130, the keyword module 140, the topic module 150, the relevancy module 160, and the search engine module 170 and their corresponding operations are described and delineated to help facilitate the understanding of different operations that may be performed with respect to the present disclosure. However, depending on certain implementations, such elements may be considered as being part of one or multiple different software or hardware elements that may be organized differently than as specifically described in the present disclosure.

The identification module 120 may be configured to identify subject matter experts. In these and other embodiments, the identification module 120 may identify subject matter experts based on publications by the subject matter experts. For example, in some embodiments, individuals who have a certain number of publications may be identified as subject matter experts. In some embodiments, the identification module 120 may determine that an individual is a subject matter expert in some subjects but not in other subjects. For example, in these and other embodiments, the identification module 120 may identify an individual as a subject matter expert in the field of chemistry but may not identify the individual as a subject matter expert in the field of biology. For example, in some embodiments, the identification module 120 may identify the field a subject matter expert is an expert in based on the publications in which the subject matter expert has published. For example, particular publications may be associated with particular fields. Alternatively or additionally, in some embodiments, the identification module 120 may identify the field a subject matter expert is an expert in based on a department or a company for which the subject matter expert works. For example, a subject matter expert employed in a physics department at a university may be identified as a subject matter expert in the field of physics. Alternatively or additionally, in some embodiments, the identification module 120 may identify the field based on topics and keywords of publications of the subject matter expert. For example, topics and keywords associated with politics may indicate that the subject matter expert is an expert in the field of political science. In some embodiments, the identification module 120 may be configured to determine that an individual is a subject matter expert based on the individual having published a particular number of publications. Alternatively or additionally, in some embodiments, the identification module 120 may be configured to incorporate the reputation of the publications in identifying the individual as a subject matter expert. For example, in some fields, particular journals may be considered more reputable than others. In these and other embodiments, publications by the individual in the particular journals may be indicative that the individual is a subject matter expert.

Alternatively or additionally, in some embodiments, the identification module 120 may identify subject matter experts based on references to the subject matter experts or references to publications of the subject matter experts. For example, individuals who are referenced frequently or whose publications are referenced frequently may be identified as subject matter experts. In some embodiments, the identification module 120 may be configured to determine that an individual is a subject matter expert based on the individual being referenced a particular number of times. Alternatively or additionally, in some embodiments, the identification module 120 may be configured to incorporate the location of the references in identifying the individual as a subject matter expert. For example, an individual may self-reference in journal articles. In these and other embodiments, the individual may cite the individual's own work. In these and other embodiments, self-referencing may not be included in the determination of the individual as a subject matter expert or as a non-subject matter expert. Additionally, in some fields, particular journals may be considered more reputable than others. In these and other embodiments, references to the individual or the publications of the individual in the particular journals may be indicative that the individual is a subject matter expert.

Alternatively or additionally, in some embodiments, the identification module 120 may identify subject matter experts based on personal websites of individuals, based on resumes of individuals, or based on other materials associated with individuals. For example, the resume of an individual may indicate that the individual has an academic degree in a particular field or has professional experience in the particular field. The identification module 120 may identify the individual as a subject matter expert based on the individual's resume. Alternatively, the personal website of the individual may include information, such as links, a profile, interests, professional accomplishments, and other information, which may indicate that the individual is a subject matter expert in one or more fields.

Alternatively or additionally, in some embodiments, the identification module 120 may obtain a list of subject matter experts. For example, in these and other embodiments, the list of subject matter experts may be generated by individuals in particular fields. For example, the identification module 120 may be configured to provide a survey to individuals in a particular field. The survey respondents may identify individuals they consider to be subject matter experts in their field.

In some embodiments, the identification module 120 may identify the subject matter experts by generating a list of authors of publications in a particular field and a list of references to publications by authors in the particular field. In these and other embodiments, authors with a number of publications greater than a predetermined number of publications or a number of references greater than a predetermined number of references may be determined to be subject matter experts. For example, in some embodiments, the predetermined number of publications may be twenty publications and the predetermined number of references may be fifty references. In these and other embodiments, an author who has published twenty-five publications may be determined to be a subject matter expert. In these and other embodiments, an author who has sixty references may be determined to be a subject matter expert. In some embodiments, subject matter experts may be identified based on both the number of publications and the number of references. Alternatively, in some embodiments, subject matter experts may be identified based on the number of publications or the number of references.

The search path module 130 may be configured to obtain multiple search paths followed by multiple users. In some embodiments, the multiple users may include subject matter experts. A search path may be a history of a search. For example, a search path may include a previous search query and multiple search materials. The previous search query may include text of one or more terms that may be entered by the user into a search engine. The search materials may include documents, articles, papers, websites, books, and other materials returned as results to performing a search using the previous search query and examined by the user during the search. In some embodiments, the user examining the search material may include the user opening a link to the search material in a web browser. For example, when the search material is available via the Internet, the search material may be determined to be examined when the user opens a link to the material. Alternatively or additionally, in some embodiments, the search material may be determined to be examined when the search material is open for a predetermined period of time. For example, in some embodiments, the search material may be determined to be examined when the search material is open for a period of five minutes. Alternatively or additionally, in some embodiments, the search material may be determined to be examined based on the user downloading the search material. Alternatively or additionally, in some embodiments, the search material may be determined to be examined based on logging keystrokes. For example, when a search material is open and keystrokes are detected scrolling through a text of the search material, highlighting the text of the search material, selecting the text of the search material, or performing other actions on the search material, the search material may be determined to be examined by the user. The search path may include the sequence of the search material examined by the user. In these and other embodiments, the search material may be ordered in the search path based on the order the search material was examined by the user during the search. For example, the first search material may be the first material examined during the search, the second search material may be the second material examined during the search, etc.

In some embodiments, the search path module 130 may be configured to obtain one or more ratings for each search material in each search path from the multiple users. In some embodiments, the ratings may be obtained in response to presenting the user with an option to rate the search material. For example, in these and other embodiments, the search path module 130 may present the user with an option to rate the search material in response to the user proceeding to examine another search material. For example, when the user moves from a first search material to a second search material, the search path module 130 may present the user with a survey about the first search material. The completed survey may provide an indication that the search material was examined by the user. In some embodiments, the search path module 130 may be configured to identify when a user proceeds from a first search material to a second search material based on logging keystrokes, detecting a tab closing in a web browser, detecting a tab change in a web browser, detecting a window closing in a web browser, detecting a tab change in a web browser, detecting network traffic, among other methods. For example, the search path module 130 may be configured to identify that the user has switched from a first browser tab associated with the first search material to a second browser tab associated with the second search material.

In some embodiments, the ratings may be obtained from the user in the form of Likert items. For example, the ratings may be on a scale from 1 to 5, where 1=not at all relevant, 2=slightly relevant, 3=neutral, 4=relevant, and 5=very relevant. Alternatively or additionally, the ratings may be on a binary scale where 0=useless and 1=useful, a 0-10 scale, or any other scale. In some embodiments, the ratings may be on a numeric scale. In some embodiments, the search path module 130 may not obtain a rating of one or more search materials from one or more users. For example, in some embodiments, a particular user may choose to not rate any search materials in the search path of the particular user. Alternatively or additionally, in some embodiments, the particular user may choose to rate some search materials in the search path but may choose not to rate other search materials in the search path. In some embodiments, multiple users may provide ratings for the same search material.

For example, in these and other embodiments, the search path may include a previous search query $Q_i$. The first search material may be $r_1$. Multiple search paths may include the first search material and different second search materials. Each of the second search materials, $r_{2,i}$, may be an additional search material that is referred to in the search material $r_1$, or may be a result of a search performed using a keyword, a phrase, or other text referred to in $r_1$ as the search query. The keyword, phrase, or other material referred to in $r_1$ may be a link material in $r_1$ that is used to perform a search to identify a subsequent search material. For example, in some embodiments, the user may perform three subsequent searches using a first phrase, a second phrase, and a third phrase referred to in $r_1$. A second search material $r_{2,1}$ may be a search material resulting from a search using the first phrase, a second search material $r_{2,2}$ may be a search material resulting from a search using the second phrase, and a second search material $r_{2,3}$ may be a search material resulting from a search using the third phrase. Similarly, the search path may include multiple third search materials. Each of the third search materials may be the result of a search using a linking material referred to in $r_{2,1}$, $r_{2,2}$, or $r_{2,3}$.

A search path may include a set of search materials in each level of the search tree. For example, the first search path may be the set of n search materials $r_1 r_{2,1} r_{3,1} \ldots r_{n,1}$. In these and other embodiments, the ith search path may be the set of m search materials $r_1 r_{2,i} r_{3,i} \ldots r_{m,i}$. The search materials $r_{n,1}$ and $r_{m,i}$ may include material which is referred to in $r_{n-1,1}$ or $r_{m-1,i}$, respectively. Alternatively or additionally, the search materials $r_{n,1}$ and $r_{m,i}$ may be the result of a search for a keyword or phrase referred to in $r_{n-1,1}$ or $r_{m-1,i}$, respectively. Although discussed with reference to search paths including more than three search materials, in some embodiments, the search paths may include fewer than three search materials. In some embodiments, the search path may additionally include the linking material used from one search material to find the subsequent search material. For example, in some embodiments, the search path may include that a search material has a reference to the subsequent search material. Alternatively or additionally, the search path may include the phrase in a search material that is used to generate a search result that includes the subsequent search material.

In some embodiments, the search path module 130 may be configured to identify $r_{n,i}$ from $r_{n-1,i}$ using keystroke logging. For example, in these and other embodiments, the search path module 130 may determine that text in $r_{n-1,i}$ is copied and pasted into a search engine, which leads to $r_{n,i}$ as a result of the search. Alternatively or additionally, in some embodiments, the search path module 130 may be configured to determine that a search which results in $r_{n,i}$ includes keywords included in $r_{n-1,i}$. For example, in these and other embodiments, the search path module 130 may determine that a search has occurred. The search path module 130 may identity the search material $r_{n,i}$ as a result of the search. The search path module 130 may identify the search query and determine that the terms of the search query are included in the search material $r_{n-1,i}$. Alternatively or additionally, in some embodiments, the search path module 130 may be configured to use gaze tracking to determine which portions of the search material $r_{n-1,i}$ the user looked at. In these and other embodiments, the search path module 130 may determine that the user looked at a particular phrase in the search material $r_{n-1,i}$ and then the user examined the search material $r_{n,i}$.

The search path module 130 may also be configured to obtain keyword information for each search material from the keyword module 140. The keyword module 140 may be configured to obtain keywords for each search material based on a text of the search material. In some embodiments, the keyword module 140 may identify keywords based on keywords indicated by one or more authors of the search material in the text of the search material. For example, some search materials may include a list of keywords as part of the text of the search material. Alternatively or additionally, in some embodiments, the keyword module 140 may be configured to identify terms used frequently in the text of the search material. The keyword module 140 may also determine the co-occurrence of the most frequently used terms in the text. The co-occurrence of the most frequently used terms may be the rate at which one frequently used term appears together with another frequently used term. Based on the co-occurrences of the frequently used terms, the keywords in the search material may be determined. In some embodiments, the keyword module 140 may also use a supervised learning approach such as lexical chains to determine keywords based on the text of the search material. A lexical chain may include a set of semantically related words of the text. The lexical chain may represent the semantic content of a portion of the text.

The search path module 130 may also be configured to obtain topic information for each search path from the topic module 150. The topic module 150 may be configured to obtain topics for the search materials of a particular search path based on common themes identified from the search materials of the particular search path. For example, in some embodiments, the topic module 150 may be configured to determine terms associated with multiple search materials in the search path. In these and other embodiments, the topic module 150 may use statistics concerning the words in each search material of the search path to generate the topics for the search path. In some embodiments, the topic module 150 may be configured to identify common themes in the search material by comparing keywords for each search material in the search path. For example, when a keyword is associated with multiple search materials of the search path, the keyword may indicate a topic of the search path.

The search path module 130 may also be configured to obtain relevancy information for each search material and each search path from the relevancy module 160. In some embodiments, the relevancy module 160 may be configured to generate a relevancy score based on the ratings for each source material and a number of paths from the first search material that include the search material. For example, in some embodiments, the relevancy score for a particular search material may be a weighted combination of the average rating of the particular search material and the number of search paths that include the search material. In some embodiments, an initial weight value for the ratings and the number of search paths may be assumed. In some embodiments, as additional users go through the search paths, the relevancy scores may be updated. In these and other embodiments, the weights may be updated based on the updated relevancy scores. For example, $f_{i,j}$ may be the rating for the search material $r_{i,j}$ from a particular user. As discussed above, in some embodiments, $f_{i,j}$ may be a numeric value with a range of 0-1, 1-5, 1-10, or any other numeric range. $N(r_{i,j})$ may be the number of paths including the search material $r_{i,j}$ starting from $r_1$. In these and other embodiments, $N(r_{i,j})$ may be greater than or equal to 1. In these and other embodiments, a larger value of $N(r_{i,j})$ may indicate that more users have examined the same search material. The relevancy score, $s_{i,j}$, for the particular search material $r_{i,j}$ may be determined as $s_{i,j}=w_1\overline{f_{i,j}}+w_n N(r_{i,j})$, where $w_1$ and $w_2$ may be the weight of the rating and the number of search paths, respectively, and $\overline{f_{i,j}}$ may be the average of $f_{i,j}$ for all users who have rated the search material $r_{i,j}$. In some embodiments, $\overline{f_{i,j}}$ may be the arithmetic mean, median, mode, or other measure of central tendency of all $f_{i,j}$. In some embodiments, some $f_{i,j}$ may be considered outliers and may not be included in the calculation of $\overline{f_{i,j}}$. In some embodiments, there may not be any $f_{i,j}$ for a particular search material. Alternatively or additionally, in some embodiments, there may be few $f_{i,j}$ for a particular source material $r_{i,j}$. For example, there may be fewer $f_{i,j}$ than a threshold number of ratings. In these and other embodiments, the relevancy score for the particular search material may be based on the $N(r_{i,j})$. In these and other embodiments, weight may be adjusted to account for the lack of rating scores.

The relevancy module 160 may also be configured to generate a relevancy score for a search path. The relevancy module 160 may generate the relevancy score of each search path as an average of the relevancy scores of each search material in the search path. For example, the relevancy score of a path i, $PS_i$, may be determined as $PS_i=\overline{s_i}$, where $\overline{s_i}$ may be the average of $s_{i,j}$, each $s_{i,j}$ representing the relevancy score of the jth search material of path i. In these and other embodiments, $\overline{s_i}$ may be the arithmetic mean, median, mode, or other measure of central tendency of all $s_{i,j}$ in path i.

The search engine module 170 may be configured to identify a search path and corresponding search materials based on a current search query from a user. For example, the search engine module 170 may be configured to obtain a current search query of a new search. For example, in some embodiments, the search engine module 170 may obtain the current search query from a communication device 180, such as the communication device 180A. The search engine module may be configured to compare the current search query of the new search with each previous search query of the search paths obtained by the search path module 130. In some embodiments, the current search query may match one or more previous search queries. In these and other embodiments, the search engine module 170 may determine that a previous search query matches the current search query based on comparing the terms of the previous search query with the terms in the current search query. In some embodiments, the search engine module 170 may ignore capitalization and spacing in the previous search query and in the current search query. In some embodiments, the search engine module 170 may identify spelling errors or differences between the previous search query and current search query and ignore these differences. In some embodiments, the search engine module 170 may ignore the order of terms in the search queries. For example, in some embodiments, "BLUE CAR" may be a match for "blue car", "bule car", "car blue", among other search queries.

Additionally or alternatively, in some embodiments, the search engine module 170 may determine that a previous search query matches the current search query based on identifying one or more terms in the previous search query as synonyms for one or more terms in the previous search query or vice versa. For example, in some embodiments, "car" may be a match for "automobile." In some embodiments, a model may be used to identify synonyms in the previous search query and the current search query. In some embodiments, a random forest or one or more neural networks may be used to determine if the current search query matches one or more previous search queries.

In some embodiments, the search engine module 170 may determine that a previous search query matches the current search query when the current search query includes the previous search query and one or more additional terms that are excluded from the previous search query. In some embodiments, the search engine module 170 may identify one or more search paths based on the search paths corresponding to the matching previous search queries. The search engine module 170 may compare the relevancy scores of the identified search paths. If one of the identified search paths has a higher relevancy score than the other search paths, the identified search path with the highest relevancy score may be selected to present to the user. As indicated above, presentation of the identified search path may include presenting one or more search materials of the identified search path. For example, the one or more search materials may be presented in descending order from highest relevancy score to lowest relevancy score based on the relevancy score of the one or more search materials. Alternatively or additionally, in some embodiments, the one or more search materials may be presented in the order in which they were examined by the user corresponding with the search path. In some embodiments, a group of the search materials with the highest relevancy scores may be presented. In these and other embodiments, the search materials not in the group of search materials may be presented to the user in response to receiving input from a user. In some embodiments, presentation of the identified search path may include presenting one or more search materials of the identified search path together with the corresponding relevancy scores of the one or more search materials.

In instances in which, two or more search paths of the identified search paths have the same highest relevancy score, the search engine module 170 may select one of the identified search paths based on an intersection between the additional terms and the topics of search paths and keywords of the search materials of the search paths. The search path with the highest intersection may be selected to present to the user. For example, in some embodiments, the additional terms may include four terms. One of the identified search paths may include topics and keywords that include two of the four terms. Another of the identified search paths may include topics and keywords that include three of the four terms. The search engine module 170 may select the identified search path that includes topics and keywords that intersect with three of the additional terms.

In some embodiments, the search engine module 170 may identify the search path with the highest intersection based on identifying synonyms of the additional terms and/or identifying synonyms of the topics and keywords. In these and other embodiments, the synonyms may be compared to determine the intersection between the additional terms and the topics and keywords of the search paths. Alternatively or additionally, in some embodiments, the search ending module 170 may determine that the additional terms are related to the topics and/or keywords of one or more search paths. In some embodiments, a model may be used to identify synonyms in the additional terms and the topics and keywords. In some embodiments, a random forest or one or more neural networks may be used to determine the intersection between the additional terms and the topics/keywords.

In some embodiments, the search engine module 170 may present the search materials of the selected search path. In some embodiments, the search engine module 170 may present the relevancy score of the search path along with the relevancy scores of the search materials of the search path. In some embodiments, the search engine module 170 may also present a search story. In these and other embodiments, the search story may include the current search query, a summary of each search material, and the linking material between each search material. In some embodiments, the search engine module 170 may be configured to present a default number of search materials. For example, in some embodiments, a user may set the default number of search materials to five. In these and other embodiments, the search engine module 170 may be configured to initially present the five search materials with the highest relevancy scores of the search path to the user. In these and other embodiments, the search engine module 170 may be configured to expand the search path to present additional search materials in response to receiving input from the user. For example, the search path may include 10 search materials. The default number of search materials may be 3. The 1st, 5th, and 9th search materials may have the highest relevancy scores. After executing the search, the search engine module 170 may present the user with the current search query, the first search material, the fifth search material, and the ninth search material, together with their corresponding relevancy ratings. In response to a selection by the user, the sixth search material through the eighth search material may also be revealed.

In some embodiments, the search engine module 170 may be configured to identify a user profile of a user associated with the search term. In these and other embodiments, the search engine module 170 may also compare the user profile of the user with one or more user profiles associated with the search paths. For example, in these and other embodiments, the search engine module 170 may compare the current search query with the previous search queries of search paths associated with user profiles similar to the user profile of the user. For example, in these and other embodiments, the search engine module 170 may compare the user profiles based on a subject matter, based on an expertise, based on prior searches of the users, or based on other data. For example, in some embodiments, the user profile of the user may include a search history. The search history may include searches about a particular subject matter. The user profile of the user may be determined to be similar to user profiles of subject matter experts in the particular subject matter. In these and other embodiments, the search path presented to the user may be a search path associated with a user profile similar to the user's user profile.

An example operation of the environment 100 is as follows. The search path module 130 may obtain a list of multiple subject matter experts. For example, in some embodiments, the identification module 120 may identify the multiple subject matter experts based on profiles of the subject matter experts, based on publications of the subject matter experts, and based on references to publications of the subject matter experts. In some embodiments, user profiles associated with the subject matter experts may also be obtained from the identification module 120.

The search path module 130 may also obtain multiple search paths followed by the multiple subject matter experts. For example, in these and other embodiments, the search path module 130 may track one or more searches performed by each of the subject matter experts. In some embodiments, the subject matter experts may perform the searches using one or more of the communication devices 180. The search path module 130 may identify the previous search query of each search performed by the subject matter experts. The search path module 130 may also identify multiple search materials returned as results to each previous search query and examined by the subject matter experts during the course of a search. In some embodiments, the search path module 130 may obtain ratings from the subject matter experts for the search materials examined by the subject matter experts. The search path module 130 may combine the previous search query and the multiple search materials to generate a search path for each search followed by the multiple subject matter experts. In some embodiments, the search path module 130 may also identify keywords in each search material using the keyword module 140 and may identify topics for each search path using the topic module 150. The search path module 130 may also obtain a relevancy score for each search material and each search path from the relevancy module 160. The relevancy module 160 may generate the relevancy scores for each search material from the ratings for each search material and from the number of search paths that include the search material. The relevancy module 160 may generate the relevancy scores for each search path from the relevancy scores for each search material in the search path.

The search engine module 170 may obtain a current search query of a new search. The search engine module 170 may compare the current search query with the previous search queries of the search paths obtained by the search path module 130. The search engine module 170 may identify one or more previous search queries that match the current search query. The search engine module 170 may identify the search path corresponding to the matching previous search queries with the highest relevancy score to the user. The search engine module 170 may present the identified search path. In some embodiments, presentation of the identified search path may include presenting the search materials of the identified search path and the relevancy scores of the search materials. In some embodiments, presentation of the identified search path may include presenting a subset of the search materials of the search path to the user based on the relevancy scores of the search materials. In these and other embodiments, the search engine module 170 may be configured to also present all of the search materials of the selected search path based on receiving input from the user.

Modifications, additions, or omissions may be made to the environment 100 without departing from the scope of the present disclosure. For example, in some embodiments, the identification module 120 and the search engine module 170 may be a part of the search path module 130. Alternatively or additionally, in some embodiments, one or more of the keyword module 140, the topic module 150, and the relevancy module 160 may be combined into one device, separated into additional devices, and/or perform additional operations. In some embodiments, the environment 100 may include ten communication devices 180, one hundred communication devices 180, one thousand communication devices 180, or any other number of communication devices 180.

Figure 2A:
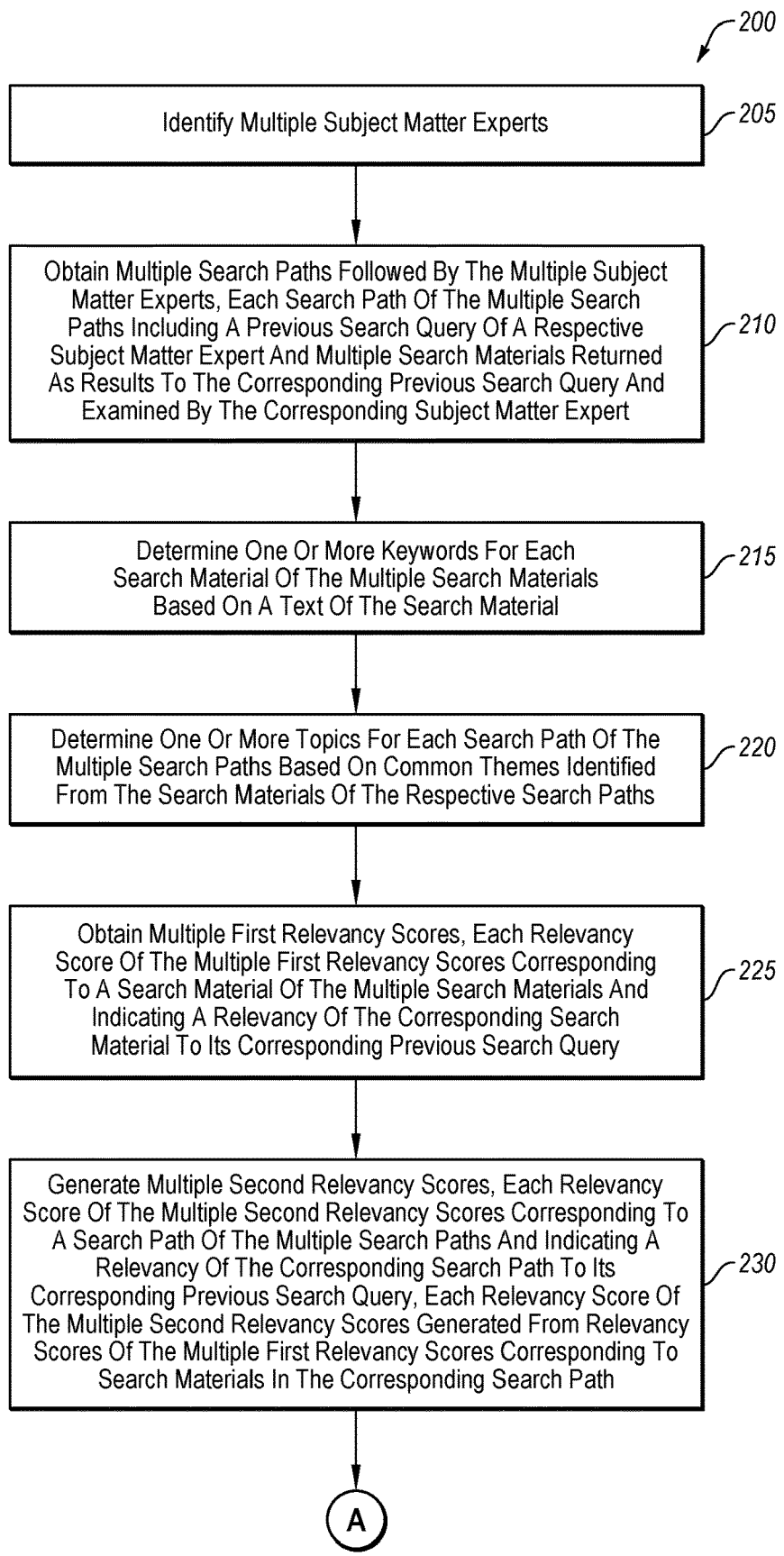
FIGS. 2A and 2B depict a flowchart of an example method of crowdsourced search result generation.
Figure 2B:
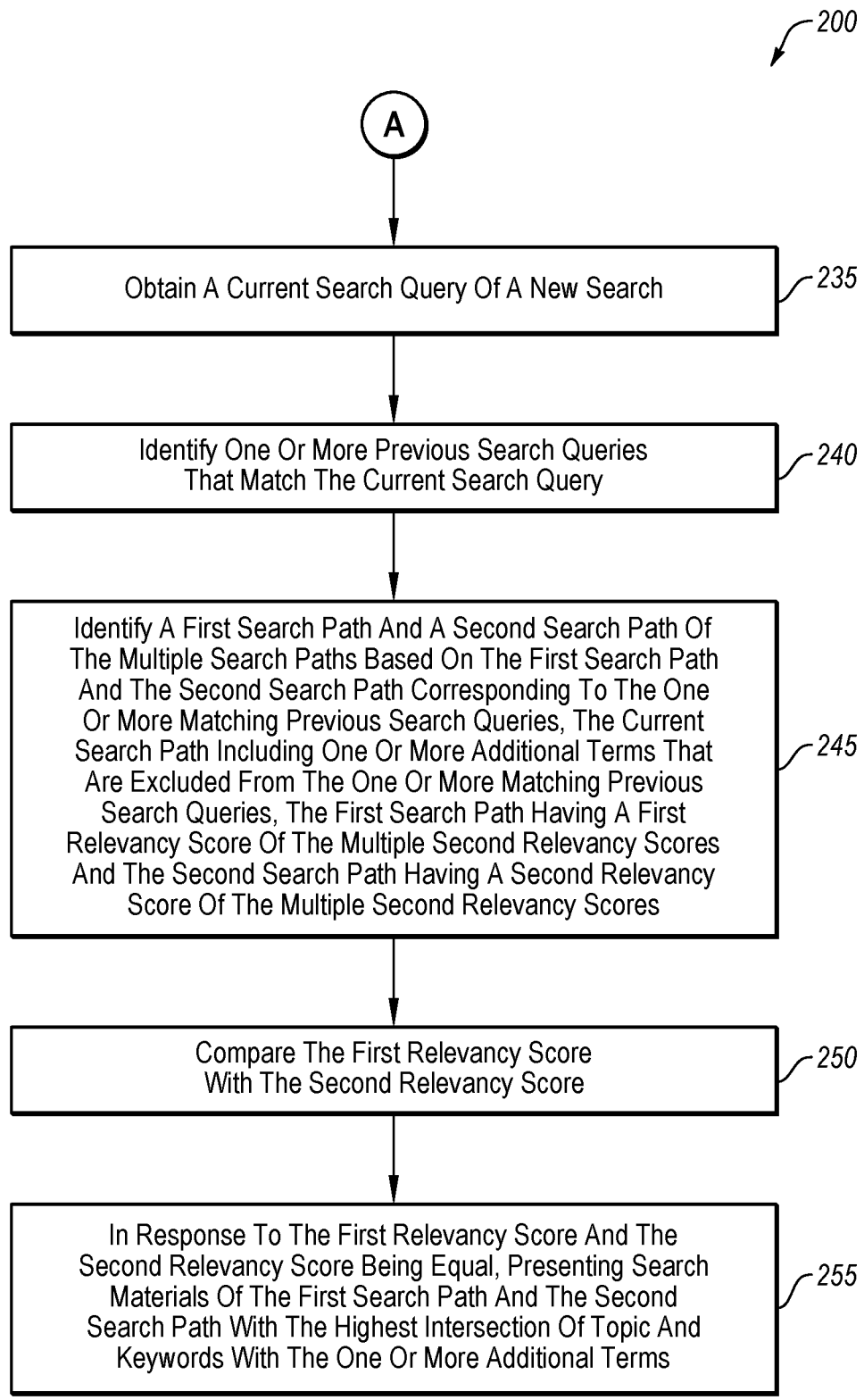

FIGS. 2A and 2B are a flowchart of an example method of crowdsourced search result generation. The method 200 may be arranged in accordance with at least one embodiment described in the present disclosure. The method 200 may be performed, in whole or in part, in some embodiments by a system and/or environment, such as the environment 100 and/or the system 400 of FIGS. 1 and 4, respectively. In these and other embodiments, the method 200 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 200 may begin at block 205, where multiple subject matter experts may be identified. In some embodiments, the multiple subject matter experts may be identified by generating a list of authors of publications, a list of references to publications by the authors, and identifying authors with a number of publications greater than a predetermined number of publications or a number of references greater than a predetermined number of references as subject matter experts. In block 210, multiple search paths followed by the multiple subject matter experts may be obtained. Each search path of the multiple search paths may include a previous search query of a respective subject matter expert and may include multiple search materials returned as results to the corresponding previous search query and examined by the corresponding subject matter expert.

In block 215, one or more keywords may be determined for each search material of the multiple search materials based on a text of the search material. In some embodiments, the keywords may be obtained from one or more keywords indicated by one or more authors of the search material. In some embodiments, one or more words frequently used in the text of the search material may be identified as keywords. In block 220, one or more topics for each search path of the multiple search paths may be determined based on common themes identified from the search materials of the respective search paths. In some embodiments, the common themes may be determined from the one or more keywords for each search material of the respective search path.

In block 225, multiple first relevancy scores may be obtained. Each relevancy score of the multiple first relevancy scores may correspond to a search material of the multiple search materials. Each relevancy score may indicate a relevancy of the corresponding search material to its corresponding previous search query. In some embodiments, each relevancy score of the multiple first relevancy scores may include a combination of one or more ratings of the corresponding search material by one or more subject matter experts of the multiple subject matter experts and a number that indicates a quantity of search paths of the multiple search paths that include the corresponding search material. In block 230, multiple second relevancy scores may be generated. Each relevancy score of the multiple second relevancy scores may correspond to a search path of the multiple search paths. Each relevancy score of the multiple second relevancy scores may be generated from relevancy scores of the multiple first relevancy scores corresponding to search materials in the corresponding search path. Each relevancy score may indicate a relevancy of the corresponding search path to its corresponding previous search query.

In block 235, a current search query of a new search may be obtained. In block 240, one or more previous search queries that match the current search query may be identified. In block 245, a first search path and a second search path of the multiple search paths may be identified based on the first search path and the second search path corresponding to the one or more matching previous search queries. The current search query may include one or more additional terms that are excluded from the one or more matching previous search queries. The first search path may have a first relevancy score of the multiple second relevancy scores and the second search path may have a second relevancy score of the multiple second relevancy scores. In block 250, the first relevancy score may be compared with the second relevancy score. In block 255, in response to the first relevancy score and the second relevancy score being equal, search materials of the first search path and the second search path with the highest intersection of topic and keywords with the one or more additional terms may be presented.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 200 may further include obtaining a user profile associated with the current search query of the new search. In these and other embodiments, the method 200 may further include identifying multiple second subject matter experts of the multiple subject matter experts, the multiple second subject matter experts selected based on a similarity between a profile of each subject matter expert of the multiple second subject matter experts and the user profile. In these and other embodiments, the first search path and the second search path may include search paths followed by the multiple second subject matter experts. Alternatively or additionally, in some embodiments, the method 200 may further include obtaining a default number that indicates a default quantity of materials. In these and other embodiments, presenting the search materials of the first search path and the second search path with the highest intersection of topic and keywords with the one or more additional terms may include presenting a group of search materials, a number of search materials in the group equal to the default number of materials, the group of search materials having the highest relevancy scores of search materials of the first search path and the second search path with the highest intersection of topic and keywords with the one or more additional terms.

Figure 3A:
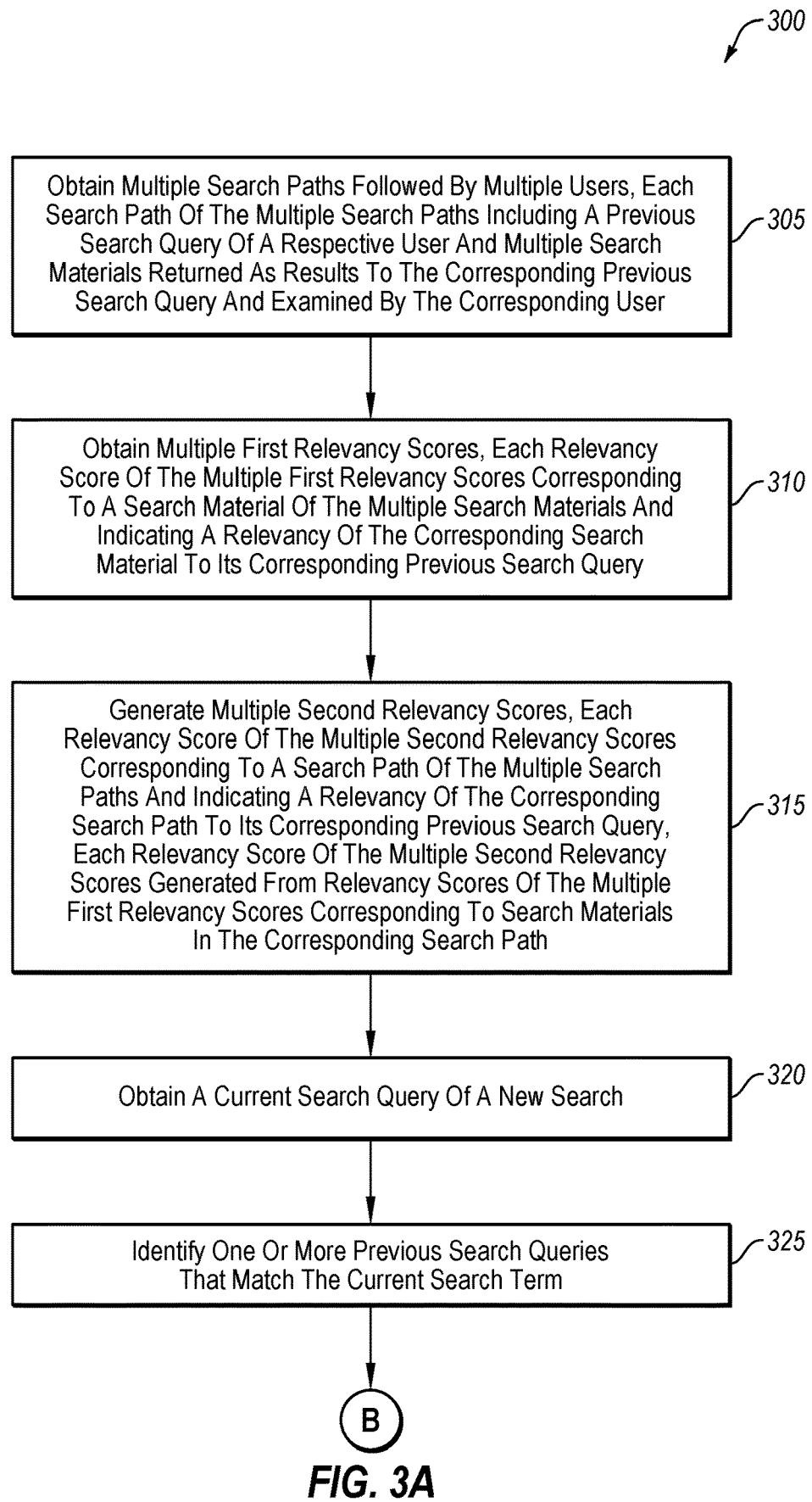
FIGS. 3A and 3B depict a flowchart of another example method of crowdsourced search result generation.
Figure 3B:
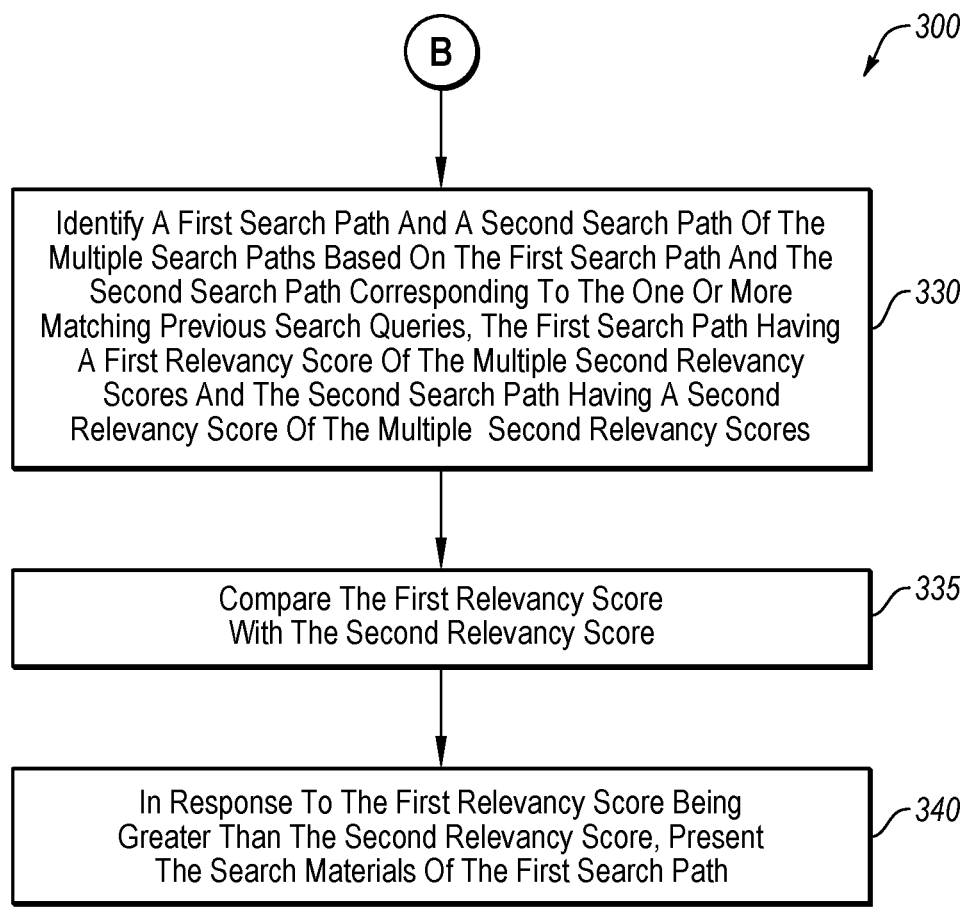

FIGS. 3A and 3B are a flowchart of another example method of crowdsourced search result generation. The method 300 may be arranged in accordance with at least one embodiment described in the present disclosure. The method 300 may be performed, in whole or in part, in some embodiments by a system and/or environment, such as the environment 100 and/or the system 400 of FIGS. 1 and 4, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 305, where multiple search paths followed by multiple users may be obtained. Each search path of the multiple search paths may include a previous search query and may include multiple search materials returned as results to the corresponding previous search query and examined by the user. In some embodiments, the search materials may include research papers, conference reports, research groups, websites, and journal articles. In block 310, multiple first relevancy scores may be obtained. Each relevancy score of the multiple first relevancy scores may correspond to a search material of the multiple search materials. Each relevancy score may indicate a relevancy of the corresponding search material to its corresponding previous search query. In some embodiments, each relevancy score of the multiple first relevancy scores may include a combination of one or more ratings of the corresponding search material by one or more users of the multiple users and a number that indicates a quantity of search paths of the multiple search paths that include the corresponding search material. In block 315, multiple second relevancy scores may be generated. Each relevancy score of the multiple second relevancy scores may correspond to a search path of the multiple search paths. Each relevancy score of the multiple second relevancy scores may be generated from relevancy scores of the multiple first relevancy scores corresponding to search materials in the corresponding search path. Each relevancy score may indicate a relevancy of the corresponding search path to its corresponding previous search query.

In block 320, a current search query of a new search may be obtained. In block 325, one or more previous search queries that match the current search term may be identified. In block 330, a first search path and a second search path of the multiple search paths may be identified based on the first search path and the second search path corresponding to the one or more matching previous search queries. The first search path may have a first relevancy score of the multiple second relevancy scores and the second search path may have a second relevancy score of the multiple second relevancy scores. In block 335, the first relevancy score may be compared with the second relevancy score. In block 340, in response to the first relevancy score being greater than the second relevancy score, the search materials of the first search path may be presented.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments.

For example, in some embodiments, the method 300 may further include obtaining a default number that indicates a default quantity of materials. In these and other embodiments, presenting the search materials of the first search path may include presenting a group of search materials of the first search path, a number of search materials in the group equal to the default number of materials, the group of search materials having the highest relevancy scores of search materials of the first search path. Alternatively or additionally, in some embodiments, the method 300 may further include presenting the first relevancy score and the relevancy scores of the search materials of the first search path.

Figure 4:
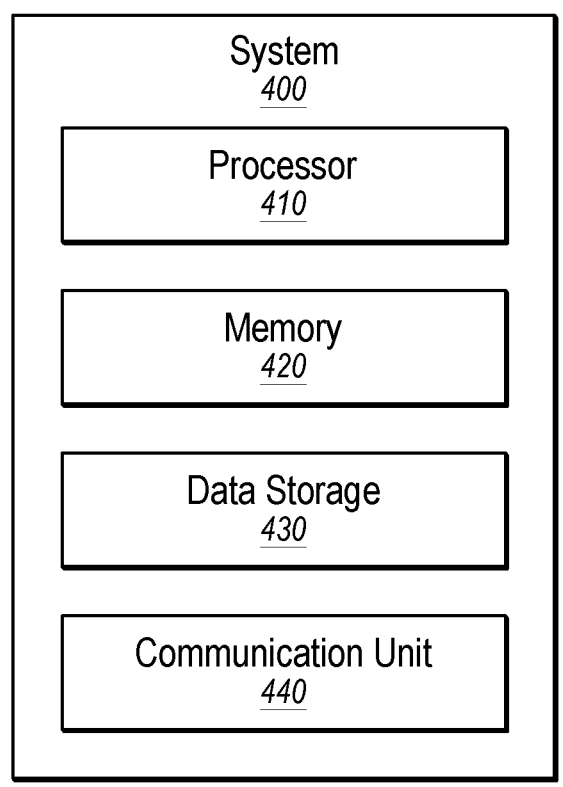
FIG. 4 illustrates an example computing system that may be configured for crowdsourced search result generation.

FIG. 4 illustrates an example system 400, according to at least one embodiment described herein. The system 400 may include any suitable system, apparatus, or device configured to identify and extract information. The system 400 may include a processor 410, a memory 420, a data storage 430, and a communication unit 440, which all may be communicatively coupled. The data storage 430 may include various types of data, such as search paths and ratings of source materials.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, the processor 410 may include any number of processors distributed across any number of network or physical locations that are configured to perform individually or collectively any number of operations described herein. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform the methods 200 and/or 300 of FIGS. 2 and 3, respectively. Additionally or alternatively, in some embodiments, a search path module (e.g., the search path module 130 of FIG. 1), a search engine module (e.g., the search engine module 170 of FIG. 1), an identification module (e.g., the identification module 120 of FIG. 1), and/or a relevancy module (e.g., the relevancy module 160 of FIG. 1) may be included in data storage 430 as program instructions to perform one or more operations of the methods 200 or 300. The processor 410 may fetch the corresponding program instructions and may load the program instructions in the memory 420. After the program instructions are loaded into the memory 420, the processor 410 may execute the program instructions such that the computing system may implement the operations associated with the above-recited components as directed by the instructions.

The memory 420 and the data storage 430 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 410.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, and/or others), and/or the like. The communication unit 440 may permit data to be exchanged with a network and/or any other devices or systems described in the present disclosure. For example, the communication unit 440 may allow the system 400 to communicate with other systems, such as the identification module 120, the search engine module 170, the communication device 180A, the communication device 180B, and the communication device 180C of FIG. 1.

Modifications, additions, or omissions may be made to the system 400 without departing from the scope of the present disclosure. For example, the data storage 430 may be multiple different storage mediums located in multiple locations and accessed by the processor 410 through a network.

As indicated above, the embodiments described herein may include the use of a special purpose or general purpose computer (e.g., the processor 410 of FIG. 4) including various computer hardware or software modules, as discussed in greater detail below. Further, as indicated above, embodiments described herein may be implemented using computer-readable media (e.g., the memory 420 or data storage 430 of FIG. 4) for carrying or having computer-executable instructions or data structures stored thereon.

As used herein, the terms "module" or "component" may refer to specific hardware implementations configured to perform the actions of the module or component and/or software objects or software routines that may be stored on and/or executed by general purpose hardware (e.g., computer-readable media, processing devices, and/or others) of the computing system. In some embodiments, the different components, modules, engines, and services described herein may be implemented as objects or processes that execute on the computing system (e.g., as separate threads). While some of the systems and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," and/or others).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, and/or others Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method to present search results, the method comprising:
    identifying a plurality of subject matter experts;
    obtaining a plurality of search paths followed by the plurality of subject matter experts, each search path of the plurality of search paths including a previous search query of a respective subject matter expert and a plurality of search materials returned as results to the corresponding previous search query and determined to be opened or downloaded by the corresponding subject matter expert;
    determining one or more keywords for each search material of the plurality of search materials based on text in the search material;
    determining one or more topics for each search path of the plurality of search paths based on common themes identified from the search materials of the respective search paths;
    obtaining a first plurality of relevancy scores, each relevancy score of the first plurality of relevancy scores corresponding to a search material of the plurality of search materials of a search path of the plurality of search paths and indicating a relevancy of the corresponding search material to its corresponding previous search query, and each relevancy score of the first plurality of relevancy scores being based on a quantity of search paths of the plurality of search paths that include the corresponding search material;
    generating a second plurality of relevancy scores, each relevancy score of the second plurality of relevancy scores corresponding to a search path of the plurality of search paths and indicating a relevancy of the corresponding search path to its corresponding previous search query, each relevancy score of the second plurality of relevancy scores generated from relevancy scores of the first plurality of relevancy scores corresponding to search materials in the corresponding search path;
    obtaining a current search query of a new search;
    identifying one or more previous search queries that match the current search query;
    identifying a first search path and a second search path of the plurality of search paths based on the first search path and the second search path corresponding to the one or more matching previous search queries, the current search query including one or more additional terms that are excluded from the one or more matching previous search queries, the first search path having a first relevancy score of the second plurality of relevancy scores and the second search path having a second relevancy score of the second plurality of relevancy scores;
    comparing the first relevancy score with the second relevancy score; and
    in response to the first relevancy score and the second relevancy score being equal, presenting search materials of the first search path and the second search path with the highest intersection of topic and keywords with the one or more additional terms.

2. The method of claim 1, wherein identifying a plurality of subject matter experts includes identifying a plurality of subject matter experts by generating a list of authors of publications, a list of references to the publications by the authors and identifying the authors with a number of publications greater than a predetermined number of publications or a number of references greater than a predetermined number of references as subject matter experts.

3. The method of claim 1, wherein determining one or more keywords for each search material of the plurality of search materials based on the text in the search material includes obtaining one or more keywords indicated by one or more authors of the search material and identifying one or more words frequently used in the text of the search material as keywords.

4. The method of claim 1, wherein each relevancy score of the first plurality of relevancy scores is further based on one or more ratings of the corresponding search material by one or more subject matter experts of the plurality of subject matter experts.

5. The method of claim 1, wherein the common themes identified from the search materials of the respective search paths are determined from the one or more keywords for each search material of the respective search paths.

6. The method of claim 1, further comprising:
    obtaining a user profile associated with the current search query of the new search; and
    identifying a second plurality of subject matter experts of the plurality of subject matter experts, the second plurality of subject matter experts selected based on a similarity between a profile of each subject matter expert of the second plurality of subject matter experts and the user profile, wherein the first search path and the second search path of the plurality of search paths include search paths followed by the second plurality of subject matter experts.

7. The method of claim 1, further comprising:
obtaining a default number that indicates a default quantity of materials,
wherein presenting the search materials of the first search path and the second search path with the highest intersection of topic and keywords with the one or more additional terms comprises presenting a group of search materials, a number of search materials in the group equal to the default number of materials, the group of search materials having the highest relevancy scores of search materials of the first search path and the second search path with the highest intersection of topic and keywords with the one or more additional terms.

8. One or more non-transitory computer-readable media that includes computer-readable instructions stored thereon that are executable by one or more processors to perform or control performance of operations comprising:
obtain a plurality of search paths followed by a plurality of users, each search path of the plurality of search paths including a previous search query and a plurality of search materials returned as results to the corresponding previous search query and determined to be opened or downloaded by the corresponding user;
determine one or more keywords for each search material of the plurality of search materials based on text in the search material;
determine one or more topics for each search path of the plurality of search paths based on common themes identified from the search materials of the respective search paths;
obtain a first plurality of relevancy scores, each relevancy score of the first plurality of relevancy scores corresponding to a search material of the plurality of search materials of a search path of the plurality of search paths and indicating a relevancy of the corresponding search material to its corresponding previous search query, and each relevancy score of the first plurality of relevancy scores being based on a quantity of search paths of the plurality of search paths that include the corresponding search material;
generate a second plurality of relevancy scores, each relevancy score of the second plurality of relevancy scores corresponding to a search path of the plurality of search paths and indicating a relevancy of the corresponding search path to its corresponding previous search query, each relevancy score of the second plurality of relevancy scores generated from relevancy scores of the first plurality of relevancy scores corresponding to search materials in the corresponding search path;
obtain a current search query of a new search;
identify one or more previous search queries that match the current search query;
identify a first search path and a second search path of the plurality of search paths based on the first search path and the second search path corresponding to the one or more matching previous search queries, the first search path having a first relevancy score of the second plurality of relevancy scores and the second search path having a second relevancy score of the second plurality of relevancy scores;
compare the first relevancy score with the second relevancy score; and
in response to the first relevancy score being greater than the second relevancy score, present search materials of the first search path.

9. The non-transitory computer-readable media of claim 8, wherein the search materials include one or more of: research papers, conference reports, research groups, websites, and journal articles.

10. The non-transitory computer-readable media of claim 8, wherein each relevancy score of the first plurality of relevancy scores is further based on one or more ratings of the corresponding search material by one or more users of the plurality of users.

11. The non-transitory computer-readable media of claim 8, the operations further comprising:
obtain a default number that indicates a default quantity of materials,
wherein presenting the search materials of the first search path comprises presenting a group of search materials of the first search path, a number of search materials in the group equal to the default number of materials, the group of search materials having the highest relevancy scores of search materials of the first search path.

12. The non-transitory computer-readable media of claim 8, the operations further comprising:
obtaining a second current search query of a second new search;
identifying one or more second previous search queries that match the second current search query;
identifying a third search path and a fourth search path of the plurality of search paths based on the third search path and the fourth search path corresponding to the one or more matching second previous search queries, the second current search query including one or more additional terms that are excluded from the one or more matching second previous search queries, the third search path having a third relevancy score of the second plurality of relevancy scores and the fourth search path having a fourth relevancy score of the second plurality of relevancy scores;
comparing the third relevancy score with the fourth relevancy score; and
in response to the third relevancy score and the fourth relevancy score being equal, presenting search materials of the third search path and the fourth search path with the highest intersection of topic and keywords with the one or more additional terms.

13. The non-transitory computer-readable media of claim 12, wherein determining one or more keywords for each search material of the plurality of search materials based on the text in the search material includes obtaining one or more keywords indicated by one or more authors of the search material and identifying one or more words frequently used in the text of the search material as keywords.

14. The non-transitory computer-readable media of claim 12, wherein the common themes identified from the search materials of the respective search paths are determined from the one or more keywords for each search material of the respective search paths.

15. A system to present search results, the system comprising:
one or more non-transitory computer-readable media that include computer-readable instructions stored thereon;
one or more processors communicatively coupled to the one or more computer-readable media, the one or more processors configured to, in response to execution of the instructions, perform or control performance of operations comprising:

obtain a plurality of search paths followed by a plurality of users, each search path of the plurality of search paths including a previous search query and a plurality of search materials returned as results to the corresponding previous search query and determined to be opened or downloaded by the corresponding user;

determine one or more keywords for each search material of the plurality of search materials based on text in the search material;

determine one or more topics for each search path of the plurality of search paths based on common themes identified from the search materials of the respective search paths;

generate a first plurality of relevancy scores, each relevancy score of the first plurality of relevancy scores corresponding to a search material of the plurality of search materials of a search path of the plurality of search paths and indicating a relevancy of the corresponding search material to its corresponding previous search query, each relevancy score of the first plurality of relevancy scores generated based on a quantity of search paths of the plurality of search paths including the corresponding search material;

generate a second plurality of relevancy scores, each relevancy score of the second plurality of relevancy scores corresponding to a search path of the plurality of search paths and indicating a relevancy of the corresponding search path to its corresponding previous search query, each relevancy score of the second plurality of relevancy scores generated from relevancy scores of the first plurality of relevancy scores corresponding to search materials in the corresponding search path;

obtain a current search query of a new search;

obtain a default number that indicates a default quantity of materials;

identify one or more previous search queries that match the current search query;

identify a first search path and a second search path of the plurality of search paths based on the first search path and the second search path corresponding to the one or more matching previous search queries, the first search path having a first relevancy score of the second plurality of relevancy scores and the second search path having a second relevancy score of the second plurality of relevancy scores;

compare the first relevancy score with the second relevancy score; and in response to the first relevancy score being greater than the second relevancy score, present a group of search materials of the first search path, a number of search materials in the group equal to the default number of materials, the group of search materials having the highest relevancy scores of search materials of the first search path.

16. The system of claim 15, wherein the search materials include one or more of: research papers, conference reports, research groups, websites, and journal articles.

17. The system of claim 15, the operations further comprising presenting the first relevancy score and the relevancy scores of the search materials of the group of search materials.

18. The system of claim 15, the operations further comprising:

obtaining a second search term for a second new search;

identifying a third search path and a fourth search path of the plurality of search paths, the second search term including the previous search query of the third search path and the previous search query of the fourth search path and one or more additional terms, the third search path having a third relevancy score of the second plurality of relevancy scores and the fourth search path having a fourth relevancy score of the second plurality of relevancy scores;

comparing the third relevancy score with the fourth relevancy score; and in response to the third relevancy score and the fourth relevancy score being equal, presenting a second group of search materials of a search path of the third search path and the fourth search path with the highest intersection of topic and keywords with the one or more additional terms, a number of search materials in the second group equal to the default number of materials, the second group of search materials having the highest relevancy scores of search materials of the search path of the third search path and the fourth search path with the highest intersection of topic and keywords with the one or more additional terms.

19. The system of claim 18, wherein determining one or more keywords for each search material of the plurality of search materials based on the text in the search material includes obtaining one or more keywords indicated by one or more authors of the search material and identifying one or more words frequently used in the text of the search material as keywords.

20. The system of claim 18, wherein the common themes identified from the search materials of the respective search paths are determined from the one or more keywords for each search material of the respective search paths.

\* \* \* \* \*